United States Patent

De Vries

[15] 3,662,293

[45] May 9, 1972

[54] ACOUSTIC-WAVE TRANSMITTING DEVICE

[72] Inventor: Adrian J. De Vries, Elmhurst, Ill.

[73] Assignee: Zenith Radio Corporation, Chicago, Ill.

[22] Filed: Mar. 17, 1971

[21] Appl. No.: 125,100

[52] U.S. Cl. ................................333/30 R, 333/72, 310/9.8

[51] Int. Cl. .....................H03h 7/02, H03h 7/30, H03h 9/00

[58] Field of Search .....................333/30, 71, 72; 310/8, 8.1, 310/9.6, 9.7, 9.8

[56] References Cited

UNITED STATES PATENTS

| | | | |
|---|---|---|---|
| 2,965,851 | 12/1960 | May, Jr. | 333/30 R |
| 3,522,557 | 8/1970 | Duncan et al. | 333/72 X |

*Primary Examiner*—Herman Karl Saalbach
*Assistant Examiner*—Marvin Nussbaum
*Attorney*—John J. Pederson and John H. Coult

[57] ABSTRACT

Acoustic-surface-wave transducers are spaced apart on the surface of a wave-propagating substrate. In response to an input signal, one transducer launches surface waves toward the other which responds thereto by developing an output signal. Without more, an undesired time-delayed output signal or "ghost" may be produced by reason of surface waves reflected back to the input transducer from the output transducer. In order to inhibit the development of ghosts, a plurality of surface discontinuities, such as grooves, are formed in the wave-propagating surface alongside the output transducer. These grooves also reflect surface waves and they are spaced from the input transducer by such a distance that surface waves reflected from the grooves reach one of the transducers in a predetermined time and phase relation with respect to an acoustic surface wave reflected by the output transducer to cause cancellation so that the development of ghosts is inhibited.

9 Claims, 4 Drawing Figures

Inventor
Adrian J. DeVries
By Francis W. Crotty
Attorney

ACOUSTIC-WAVE TRANSMITTING DEVICE

BACKGROUND OF THE INVENTION

This invention pertains to solid-state circuitry. More particularly, it relates to surface wave integratible filters that have come to be known by the term SWIFS.

It is known that an electrode array composed of a pair of interleaved combs of conducting teeth at alternating potentials, when coupled to a piezoelectric medium, produce acoustic surface waves on the medium. In a simplified embodiment of a ceramic wafer polarized perpendicularly to the propagating surface, the waves travel at right angles to the teeth. The surface waves are converted back into electrical signals by a similar array of conductive teeth coupled to the piezoelectric medium and spaced from the input electrode array. In principle, the tooth pattern is analogous to an antenna array. Consequently, similar signal selectivity is possible, thereby eliminating the need for the critical or much larger and more cumbersome components normally associated with selective circuitry. Thus, such a device, with its small size, is particularly useful in conjunction with solid-state functional integrated circuitry where signal selectivity is desired. A number of different versions of these SWIF devices, together with various modifications and adjustments thereof, are described and others are cross-referenced in copending application Ser. No. 721,038, filed Apr. 12, 1968 now U.S. Pat. No. 3,582,838, and assigned to the assignee of the present application.

The SWIF has a finite distance between its input and output transducers. Hence, a finite time is required for an acoustic surface-wave signal to travel along the path from the input transducer to the output transducer. At that output transducer, part of the acoustic wave energy is converted to electrical energy and delivered to the load. Another part of the acoustic wave energy travels past or beyond the output transducer to the end of the substrate where it may be terminated or dissipated. A still further part of the acoustic wave energy is reflected from the output transducer, back along the original path toward the input transducer. This reflected surface wave, which is identical in frequency range to the original surface wave but smaller in magnitude, intercepts the input transducer from which it is again similarly reflected back along the same path to the output transducer where it results in a diminished replica of the original surface-wave signal at the output transducer. Consequently, this reflected signal, which is a reduced amplitude version of the original surface-wave signal, arrives at the output transducer later than the original surface wave signal, the time delay being equal to twice the time required for a surface-wave signal to traverse the path from the input to the output transducers. If such SWIFs are used, for example, as signal-selective devices in a television intermediate-frequency amplifier, the reflected signal components may appear as undesirable ghosts in the picture.

Known methods for approaching this problem have included optimizing the signal-transducing characteristics of the output transducer, depositing a surface-wave attenuating material between the input and output transducers and reducing the time delay by decreasing the spacing between the two transducers. Certain undesirable attributes of those approaches are discussed in copending application Ser. No. 680,654, filed Nov. 6, 1967 now U.S. Pat. No. 3,596,211 and assigned to the assignee of the present application. This latter application describes the use of an additional transducer, spaced from the input and output transducers, and responsive to a portion of the original surface waves for generating still additional acoustic surface waves that at least partially counteract the undesired acoustic waves reflected back from the output transducer. In that application, the additional transducer is also an electrode array composed of a pair of interleaved conductive combs across which a load impedance is coupled that serves to establish the magnitude of the compensating waves emanating from the additional transducer. While this technique is a decided improvement over the earlier approaches, it presents the complication of having to deposit the electrodes for the additional transducer on the substrate together with their connections to the added load impedance.

It is, accordingly, a general object of the present invention to provide a new and improved acoustic-wave transmitting device that avoids or at least reduces undesirable features in prior devices.

It is a specific object of the present invention to provide an acoustic-wave transmitting device which adapts and enlarges upon the principles underlying the techniques disclosed in the last-mentioned copending application in order to achieve such additional advantages as simplification and increased efficiency.

It has been known in surface wave devices to utilize partially reflecting perturbations that extend across the path of the waves in order to achieve frequency selectivity variation in that portion of the acoustic waves that is transmitted across the perturbations. It is a further object of the present invention to achieve the foregoing aims and objectives by taking advantage of wave energy reflected by perturbations disposed transversely to the acoustic wave path and utilizing such passively reflected energy for effecting cancellation of spurious wave energy.

An acoustic-wave transmitting device constructed in accordance with the present invention, therefore, includes an acoustic-wave-propagating medium. First transducer means responsive to an input signal are included for launching in the medium desired acoustic surface waves that exhibit maximum amplitude at a predetermined wavelength. In response to those acoustic surface waves, second transducer means develop an output signal. The second or output transducer means is a partial reflector of acoustic surface waves so that a portion of the launched waves is returned to the first transducer means where it is reflected a second time and redirected to the second transducer means where it develops an undesired output signal which is a replica of, although reduced in amplitude and delayed in time with respect to, the desired output signal. A plurality of substantially similar surface discontinuities, such as grooves, are formed in the medium and disposed across the wave propagation path of an acoustic surface wave launched by the first transducer means. The surface discontinuities have a center-to-center spacing of one-half the acoustic wavelength. Further, the surface discontinuities are reflective of acoustic surface waves and have a spacing along the wave propagation path to cause the acoustic surface wave reflected by the surface discontinuities to reach one of the transducer means in a predetermined time and phase selection with respect to an acoustic surface wave reflected by the second transducer means to at least partially inhibit the development of the undesired output signal.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIG. 2*b* is a fragmentary cross-sectional view depicting a modified form of the device shown in FIG. 2*a.

With reference to FIG. 1, an input signal source 10 is connected across an electrode array 12 which is mechanically coupled to a piezoelectric acoustic-wave-propagating medium or substrate 13 to constitute therewith an input transducer. An output electrode array 14 is also mechanically coupled to substrate 13 to constitute therewith an output transducer. Electrode arrays 12 and 14 are each constructed of two interleaved comb-type electrodes of a conductive material, such as gold or aluminum, which may be vacuum deposited on the smoothly-lapped and polished planar upper surface of substrate 13. The piezoelectric material is one, such as PZT, quartz or lithium niobate, that propagates acoustic surface waves.

Figure 1:
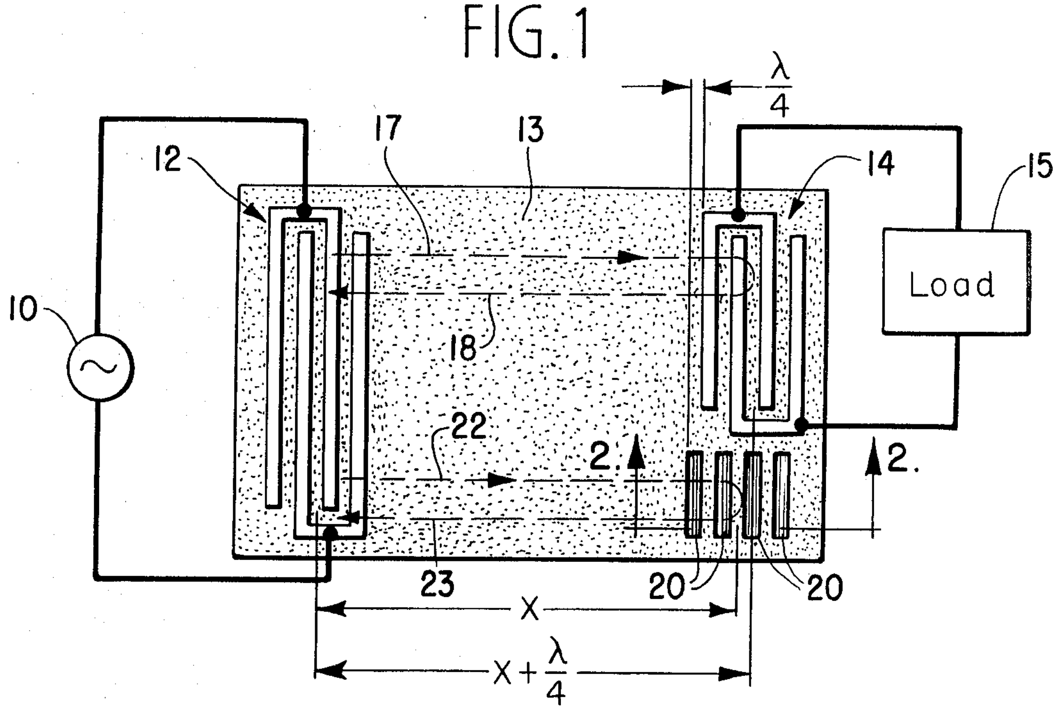
FIG. 1 is a partly schematic plan view of an acoustic-wave transmitting device.

In operation, direct piezoelectric surface-wave transduction is accomplished by input transducer 12. Periodic electric fields are produced across the comb array when a signal from source 10 is applied to the electrodes. These fields cause perturbations or deformations of the surface of substrate 13 by piezoelectric action. Efficient generation of surface waves occurs when the strain components produced by the electric fields in the piezoelectric substrate substantially match the strain components associated with the surface-wave mode. These mechanical perturbations travel along the surface of substrate 13 as Raleigh waves representative of the input signal.

Source 10 might, for example, be the radio-frequency portion of a television receiver tuner that produces a range of signal frequencies. However, due to the selective nature of transducers 12 and 14, only a particular frequency and its intelligence-carrying sidebands are converted to surface waves. Those surface waves are transmitted along the substrate to output transducer 14 where they are converted to an electrical signal for application to load 15 which in this example represents a subsequent radio-frequency-input stage of the tuner such as the heterodyne converter which downshifts the signal frequency to an intermediate frequency. Utilizing a lithium niobate substrate in that embodiment, the teeth of both transducers 12 and 14 are each about 4 microns wide and are separated by a center-to-center spacing of 8 microns for the application of a radio-frequency signal in standard program channel 13 within which the video carrier is located at 211.25 MHz. The spacing between transducer 12 and transducer 14 is on the order of 60 mils and the width of the wavefront is approximately 0.1 inch. This structure of transducers 12 and 14 together with substrate 13 can be compared to a cascade of two tuned circuits with a resonant frequency of approximately 211 MHz; as indicated, the resonant frequency is determined, at least to a first order, by the spacing of the teeth.

The potential developed between any given pair of successive teeth in electrode array 12 produces two waves traveling along the surface of substrate 13, in opposing directions, perpendicular to the teeth for the illustrative isotropic case of a ceramic which is poled perpendicularly to the surface. When the center-to-center distance between the teeth or electrodes of transducers 12 and 14 is one-half of the acoustic wavelength of the wave at the desired input frequency, or is an odd multiple thereof, relative maxima of the output waves are produced by piezoelectric transduction. For increased selectivity, additional electrode teeth may be added to the comb patterns of transducers 12 and 14. Further modifications and adjustments are described and others are cross-referenced in the aforementioned copending application Ser. No. 721,038 for the purpose of particularly shaping the response presented by the filter to the transmitted signal. Techniques are also there referred to for attenuating or advantageously making use of the one of the two surface waves that travel to the left from transducer 12 in FIG. 1. It will suffice for purposes of understanding the present invention to consider only the acoustic surface waves that travel to the right from transducer 12 in the direction toward transducer 14.

Not all of the acoustic energy arriving at transducer 14 is converted to electrical energy. It has been found that output transducer 14 is a partial reflector of acoustic surface waves so that part of the wave energy is reflected back along the original acoustic wave signal path. Thus, when the surface wave traveling to the right of input transducer 12, along a path 17, intercepts output transducer array 14, a reflected surface wave of reduced amplitude is created. This reduced-amplitude reflected surface wave travels along a return path 18 to transducer 12 where it is again similarly reflected and redirected, in further attenuated form, back along the propagating medium toward output transducer 14. Consequently, a diminished replica of the original surface wave arrives at the output transducer later in time than the original surface wave arrives at that transducer. The time delay of the diminished replica is equal to twice the amount of time required for a surface wave to traverse the path initially from the input transducer to the output transducer. This diminished replica may be considered spurious acoustic-surface-wave energy and, may produce an undesired output signal such as the aforementioned "ghosts."

To the end of at least partially counteracting that spurious energy, a plurality of substantially similar surface discontinuities are provided in substrate 13, the wave propagating medium, being disposed across the wave propagating path of an acoustic surface wave launched by input transducer 12 with a center-to-center spacing along that path of one-half the acoustic wavelength. The discontinuities may take the form of steps or protuberances extending above the surface of substrate 13 but it is perhaps easier to utilize a series of grooves 20 milled or otherwise formed into the upper surface of the substrate. Individually, the elongated grooves are disposed at right angles to and across the surface-wave path. As specifically embodied in FIG. 1, grooves 20 thus are disposed generally alongside transducer 14 and are oriented to lie in the same direction relative to the acoustic wave travel as the teeth of transducer 14. Of course, the electrodes of input transducer 12 span nearly the entire width of substrate 13 so that output transducer 14 and grooves 20 are disposed across the propagation path of surface waves launched by transducer 12.

The surface discontinuities or grooves 20 are also reflective of acoustic surface waves and have a spacing from transducer 12 along the wave propagation path to cause the acoustic surface wave reflected by the surface discontinuities to reach transducer 12 in a predetermined time and phase relation with respect to an acoustic surface wave reflected by output transducer 14 to at least partially inhibit the development of ghosts by cancellation of the reflected waves. In achieving this result in FIG. 1, grooves 20 have an "effective" spacing from transducer 12 that is ¼ acoustic wavelength different from the spacing of transducer 14 from transducer 12. As will be described in more detail below, the "effective" spacing is a function of both spatial distance and an equivalent reflector spacing which arises from the electrical and mechanical properties of the arrangement. The actual physical spacings of grooves 20 and transducer 14 relative to transducer 12 may be the same. For illustrative purposes however, the physical spacings in FIG. 1 are shown to be one-fourth wavelength different. Thus, denominating by the letter X the center-to-center spacing between the plurality of grooves 20 and the array of transducer 12, the center-to-center spacing between transducers 12 and 14 is the is the quantity $X + \lambda/4$ where $\lambda$ wavelength of the acoustic surface waves in the medium.

In operation, grooves 20 are reflective of the acoustic surface waves propagated in the wave path indicated by arrow 22. The grooves reflect a significant part of the acoustic wave energy incoming along path 22 backwardly to transducer 12 along a reverse path 23. In this discussion, dashed lines with directional arrows have been used to represent the surface waves traveling along substrate 13 and their paths. It should be understood that the surface waves actually are composed of wavefronts of a width corresponding to the length of the transducer electrodes or teeth and, with respect to return path 23, the length of grooves 20.

Transducer 12 responds to an input signal from source 10 to launch acoustic surface waves toward transducer 14 and toward grooves 20. Because the length of the teeth in transducer 14 is substantially longer than the length of grooves 20, most of the acoustic surface waves traveling to the right of transducer 12 intercept output transducer 14 which responds thereto to develop an output signal for application to load 15.

However, part of the acoustic surface wave energy reaching transducer 14 is reflected back to input transducer 12. Moreover, another portion of the original surface-wave energy traveling along path 22 intercepts grooves 20 and produces a compensating surface wave which is reflected back toward input transducer 12.

Two oppositely phase surface waves of equal power, traveling in the same direction and intercepting the same transducer, produce opposite-polarity electrical signals of equal magnitude in the transducer that cancels one another. This electrical signal cancellation allows the two surface waves to intercept transducer 12 without creating any further reflected surface wave. In the illustrated embodiment, therefore, the ½ wavelength (or odd multiple thereof) "effective" differential distance that the reflected surface wave travels in returning along path 18, as compared with the reflected surface wave returning along path 23, creates the 180° phase shift necessary for signal cancellation and consequent elimination of further reflections. The effects of the surface waves reflected at transducer 14 are reduced by eliminating the secondary reflection of these reflected surface waves that otherwise occurs at input transducer 12. Consequently, delayed and reduced-amplitude replicas of the original acoustic surface waves launched by transducer 12 are prevented from reaching the output transducer and developing spurious ghosts in the form of time delayed electrical signals.

Figure 2A:
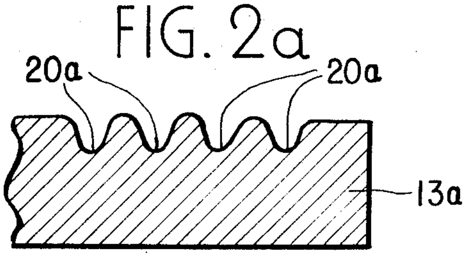
FIG. 2*a* is a fragmentary cross-sectional view taken along the line 2—2 in FIG. 1.
Figure 2B:
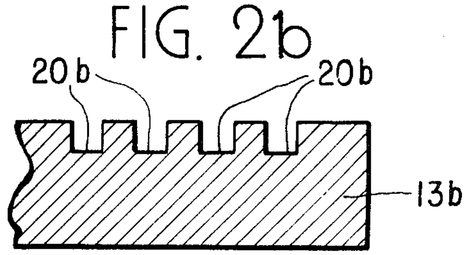

In practice, grooves 20 may have any of several different cross-sectional shapes. As illustrated in FIG. 2*a*, grooves 20*a* define an undulating surface in the wave-propagating portion of substrate 13*a*. As alternatively shown in FIG. 2*b*, grooves 20*b* may define elongated rectangular slots in the surface of substrate 13*b*. For the purpose of clarity, FIGS. 2*a* and 2*b* have been simplified by omitting therefrom items located behind the plane of the drawing such as the end walls of grooves 20 and the conductive elements of transducer 14.

Whatever their precise shape, grooves 20 constitute discontinuities in the wave-propagating surface of substrate 13 that function passively to reflect portion of the surface wave traversing path 22 with a high degree of reflection efficiency. The efficiency of reflection is proportional to the depth and shape of the grooves, the number of grooves and their individual lengths. For each slot of the configuration shown in FIG. 2*b*, it has been shown that the reflection coefficient is approximately $2h/\lambda$, where $h$ is the depth of the slot and $\lambda$ is the acoustic wavelength in the substrate. Each semi-circular groove in FIG. 2*a* exhibits a reflection coefficient of approximately $2R/\lambda$, where R is the radius of the groove. Up to a point, then, increased reflection is achieved by forming deeper grooves. Assuming all grooves are of the same physical size and character, each successive groove reflects the same proportion of the surface wave energy intersecting it. Thus, the first groove encountered by the traveling surface waves reflects the largest proportion of the oncoming wave energy, while the succeeding grooves respectively contribute successively smaller portions of the total reflected wave energy. For the case in which the reflection coefficient is fairly small, however, the total signal reflected from the grooves is approximately the product of the number of grooves and the amount of reflection per groove.

Figure 3:
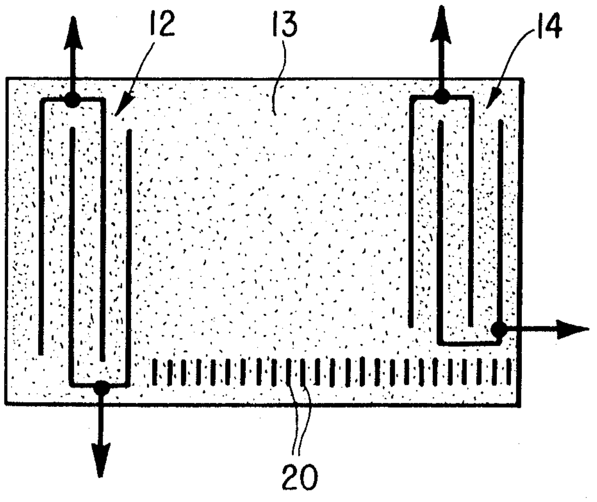
* and FIG. 3 is a schematic diagram of a device similar to that of FIG. 1 but including a modified arrangement of the different components therein.

The bandwith of the signals over which significant passive reflection by grooves 20 occurs is inversely proportional to the number of grooves. When it is desired, as in the usual case, that the cancellation occurs over the same bandwith as that of the desired output signal developed by transducer 14 for application to load 15, the number of grooves is, in general, approximately the same as the number of teeth in transducer 14. On the other hand, a comparatively increased number of grooves may be utilized where cancellation is needed only over a smaller frequency range. This is schematically illustrated in FIG. 3 wherein a very large number of grooves 20 are formed along one side of the propagating surface of substrate 13. The greatly increased number of grooves, as compared with the number of teeth in transducer 14, create passively-reflected surface waves returning to transducer 12 that exhibit, as compared with the device of FIG. 1, a somewhat high cancellation amplitude over a narrower frequency range.

Where, for practical reasons, the amount of reflection from each of grooves 20 is low, the arrangement of FIG. 3 also is advantageous. The large number of grooves 20 in the FIG. 3 version permits the attainment of a very high overall efficiency of reflection from the grooves even though they are of a lesser length than in the FIG. 1 embodiment. At the same time, the teeth in transducer 14 in FIG. 3 are that much longer so as to intercept a correspondingly greater portion of the total acoustic wave energy launched by transducer 12. Hence, the insertion loss of the total filter as incorporated into a complete signal-transmission system is correspondingly reduced.

While grooves 20 may be formed in the surface of substrate 13 by strictly-mechanical cutting or milling techniques, the small spacings encountered at the signal wavelengths of most frequent interest lend themselves better to the use of conventional micro-circuit techniques. Thus, an appropriate approach is to coat the surface of substrate 13 with a photosensitive resist which then is exposed to radiation so as to form a pattern of soluble and insoluble areas that define a latent image of the pattern of grooves. In a manner well-known, as such, the portions of the resist overlying the intended groove areas are then removed and the grooves themselves are etched into the surface by application of a liquid that eats into the material of the substrate. Utilizing a scribing technique, grooves 20 may alternatively be cut into the surface of substrate 13 by means of a high-energy laser beam.

Returning to the "effective" difference in spacings of transducer 14 and grooves 20 from transducer 12, it has been indicated that the result sought is to space the patterns so that the phase difference at transducer 12 between the two reflected waves is $\pi$ radians and to make the magnitude of the reflected waves such that the energy in both waves is the same. The energy relationship may be expressed:

$$W_1 I_1 = W_2 I_2, \qquad (1)$$

where $W_1$ and $W_2$ are the respective widths of the reflected wavefronts in paths 18 and 23 and $I_1$ and $I_2$ are the intensities of the waves reflected respectively along those paths.

The magnitude and phase of the wave reflected from transducer 14 is a function of the electrical loading on that transducer. Its reflection coefficient $r_1$ may be calculated from the relationship:

$$r_1 = (Z - Z_o/Z_o + Z), \qquad (2)$$

where $Z_o$ is the acoustic characteristic impedance of the surface wave "transmission line" and $Z$ is the acoustic impedance presented by transducer 14 to the wave impinging upon it. It may further be shown that $Z$ may be approximated from the expression:

$$Z = Z_o + 4N^2 Z_A\,; \qquad (3)$$

where $N$ is the number of transducer sections (number of teeth in the comb) and $Z_A$ represents, in acoustical terms, the value of the electrical termination of the transducer (including its clamped capacitance). Optimum power is derived by transducer 14 from the incident acoustic wave when:

$$Z_A = Z_o/2N^2\,. \qquad (4)$$

One way of satisfying equation (4) when load 15 is resistive is to tune out the clamped capacitance by means of an inductive coil coupled across transducer 14. When optimally matched, reflection coefficient $r_1$ has a value of −0.5. However, the use of physical coils generally is undesirable in an integrated circuit environment. In that case, optimum power transfer requires that the magnitude of the load resistance at least approximate the impedance of the clamped capacitance. Strictly speaking, this situation is obtained only when the impedance of the clamped capacitance is less than $Z_o/2N^2$ which usually is the case in practice. Transducer impedance $Z$ then is a complex function of frequency as a result of which reflection coefficient $r_1$ differs in phase and in magnitude from the arrangement in which the clamped capacitance is inductively tuned out. For the conditions discussed, the magnitude usually is smaller than 0.5. In any event, the phase of the wave reflected from transducer 14 is a function of the load impedance in this second approach.

As a result of the described effect of the electrical termination as well as the effect of the mechanism of reflection of the wave from grooves 20, the two reflected waves can be caused to differ in relative phase as determined at equivalent places, such as on arrival at transducer 12. Letting the quantity $\alpha$ (in degrees) represent the delay of the wave reflected along path 23 relative to the wave reflected along path 18, such delay can be expressed in terms of equivalent reflector spacing $Y$ by the relationship:

$$Y=(\alpha/2)(\lambda/2\pi)\,. \qquad (5)$$

Of course, the delay in equation (5) is $\alpha/2$ because the wave traverses a spacing twice in the process of reflection. When the patterns are not aligned, as in FIG. 1, there also exists a spatial difference D between the respective spacings of transducer 14 and grooves 20 from transducer 12. Accordingly, the desired "effective" spacing difference of $\lambda/4$ is achieved by satisfying the relationship:

$$Y+D=\pi/2, \qquad (6)$$

the latter term including any odd multiple of $\pi/2$. In actual practice, the impedance of load 15 usually is selected to achieve maximum power transfer. Consequently, spatial distance $D$ then is selected to satisfy equation (6). The latter selection may be made either by a cut-and-try approach or by calculation after first measuring the phase change in the waves reflected along path 18.

As so far described, the grooves are located more or less alongside output transducer 14 and respond directly to a portion of the surface waves launched by input transducer 12. This is not a necessary restriction. As specifically illustrated, the grooves intercept a portion of the launched acoustic waves and reflect that portion to arrive at input transducer 12 in counterphase with the reflected waves attributable to the reflective properties of output transducer 14. Alternatively, the grooves may be located to reflect a portion of the waves previously reflected from the output transducer. Those waves re-reflected from the grooves then arrive at the output transducer in counterphase with another portion of the waves re-reflected to the output transducer from the input transducer. As a still further alternative, the grooves may be positioned to the side of transducer 14 remote from transducer 12 to reflect waves transmitted beyond the output transducer, those waves being reflected by the grooves back to the output transducer to arrive in counterphase with reflected waves also arriving at that output transducer from the input transducer. Whatever the specific arrangement, the essential requirement is that the grooves be successively spaced along a portion of the path of any acoustic waves of the appropriate wavelength and that they reflect those acoustic waves to one of the transducers wherein they arrive in counterphase with reflected waves attributable to output transducer 14 and also arriving at that same transducer.

While several specific examples of correlation between the characteristics of grooves 20 and those of the desired output signal response have been mentioned, it is, of course, evident that for any given application the specific physical characteristics of the grooves will be selected and tailored in accordance with the specific passive cancellation effect desired. In any event, the cancellation effect is obtained by the most simple expedient of just forming grooves in the surface of the substrate. No conductive coatings, electrical loads, or electrical interconnections are required.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. An acoustic-wave transmitting device comprising:

an acoustic-wave propagating medium;

first transducer means responsive to an input signal for launching in said medium acoustic surface waves of a predetermined wavelength;

second transducer means responsive to said acoustic surface waves for developing a desired output signal, said second transducer means also being a partial reflector of acoustic surface waves so that a portion of said launched waves is returned to said first transducer means where it is reflected a second time and redirected to said second transducer means where it develops an undesired output signal which is a substantial replica of, although reduced in amplitude and delayed in time with respect to, said desired output signal;

a plurality of substantially similar surface discontinuities in said medium disposed across the wave propagation path of an acoustic surface wave launched by said first transducer means with a center-to-center spacing along said path of one-half said wavelength, said surface discontinuities being reflective of acoustic surface waves and having a spacing along said propagation path to cause the acoustic surface wave reflected by said surface discontinuities to reach one of said transducer means in a predetermined time and phase relation with respect to an acoustic surface wave reflected by said second transducer means to at least partially inhibit the development of said undesired output signal.

2. A device as defined in claim 1 in which said surface discontinuities comprise a series of parallel arranged grooves formed in the surface of said medium.

3. A device as defined in claim 2 in which said grooves individually define elongated rectangular slots in the surface of said medium.

4. A device as defined in claim 2 in which said grooves constitute undulations in the surface of said medium.

5. A device as defined in claim 1 in which said first transducer means includes a pair of interleaved combs of conductive electrodes disposed on the propagating surface of said medium with the electrodes of said combs spaced apart by one-half said wavelength, and in which said second transducer means includes another pair of interleaved combs of conductive electrodes disposed on said surface in spaced relation to said first pair of combs with the electrodes in said other pair of combs having the same inter-electrode spacing but a shorter length than said electrodes of said first pair of combs.

6. A device as defined in claim 5 in which said pair of combs of said first and second transducer means are spaced apart by a predetermined distance and in which said grooves are effectively spaced from said combs of said first transducer means by a distance differing from said predetermined distance by one-fourth said wavelength.

7. A device as defined in claim 5 in which said pair of combs of said second transducer means has a spacing from said first transducer means which is greater than the effective spacing of said grooves from said first transducer means by a distance of one-fourth said wavelength.

8. A device as defined in claim 5 in which the length of the electrodes in said second transducer means is substantially greater than the length of said grooves.

9. A device as defined in claim 1 in which said first transducer means launches acoustic surface waves along a path that extends across substantially the entire width of said substrate, in which said second transducer means is disposed in one portion of said path while said surface discontinuities are disposed in a separate portion of said path disposed laterally from said one portion thereof.

* * * * *